United States Patent [19]

Charlesby et al.

[11] 3,892,594
[45] July 1, 1975

[54] PROCESS OF MAKING A SELF CONTAINED ELECTRODE SEPARATOR FOR PRIMARY AND SECONDARY ELECTROLYTIC CELLS

[75] Inventors: Arthur Charlesby; Peter John Fydelor, both of Swindon; Adele Patricia Morris, New Malden, all of England

[73] Assignee: National Research Development Corporation, London, England

[22] Filed: Dec. 22, 1970

[21] Appl. No.: 100,828

[30] Foreign Application Priority Data

Dec. 22, 1969 United Kingdom............... 62234/69

[52] U.S. Cl. .......... 136/148; 117/DIG. 6; 117/62.1; 117/93.31; 264/272
[51] Int. Cl. ............................................ H01m 3/00
[58] Field of Search.......... 136/120 R, 120 FC, 147, 136/148, 146; 204/159.15, 159.17, 296; 260/2.2 R; 117/62.1, 93.31, DIG. 6; 264/272

[56] References Cited
UNITED STATES PATENTS

| | | | |
|---|---|---|---|
| 3,124,520 | 3/1964 | Juda................................. | 136/86 R |
| 3,211,808 | 10/1965 | Young et al. .................. | 117/DIG. 6 |
| 3,376,168 | 4/1968 | Horowitz ........................ | 136/153 X |
| 3,427,206 | 2/1969 | Scardavill et al. ............ | 117/93.31 X |
| 3,489,699 | 1/1970 | Battaerd et al. ............ | 204/159.17 X |
| 3,595,698 | 7/1971 | Kordesch......................... | 136/146 X |
| 3,615,865 | 10/1971 | Wetherell .......................... | 136/146 |
| 3,759,738 | 9/1973 | Misumi et al. .................... | 117/93.31 |

Primary Examiner—L. Dewayne Rutledge
Assistant Examiner—M. J. Andrews
Attorney, Agent, or Firm—Cushman, Darby & Cushman

[57] ABSTRACT

Selectively semi-permeable separators for electrolytic cells which are graft copolymers are produced by a process in which the electrode is totally encapsulated in a film of base polymer which is then graft copolymerised with a suitable ethylenically unsaturated carboxylic acid monomer, such as acrylic or methacrylic acid.

Suitable base polymers include hydrocarbon polyolefins such as polyethylene, polypropylene, poly-4-methylpentene-1, polyamides such as the nylons and fluorinated polyolefins such as polytetrafluoroethylene. The base polymer may be applied to the electrode by heat sealing in a film, or by application of a dispersion of base polymer followed by removal of the dispersant and coalescing of the base polymer, or by dipping a heated electrode into a fluidised bed of particulate base polymer followed by coalescing of the base polymer. The graft copolymerisation is conveniently carried out by ionising radiation, preferably gamma-photons or fast electrons, and a cobalt-60 source is convenient.

The invention is applicable to electrodes for alkaline secondary cells, such as silver/zinc, silver/cadmium or nickel/zinc cells, silver primary cells, metal/air cells of both primary and replateable types and fuel cells.

22 Claims, No Drawings

PROCESS OF MAKING A SELF CONTAINED ELECTRODE SEPARATOR FOR PRIMARY AND SECONDARY ELECTROLYTIC CELLS

The present invention relates to electrolytic cells and is concerned with the provision of semi-permeable separators for the electrodes of such cells and processes for the manufacture thereof.

Semi-permeable separators are included in electrolytic cells around the electrodes to retain soluble ionic species formed at the electrode in the vicinity thereof. Separators are applicable to primary cells and also to secondary cells in which soluble ionic species may be reversibly formed in the course of the charge/discharge cycle to which such cells are subjected. Such separators are preferably selectively semi-permeable in that they retain the particular ionic species reversibly formed during the charge/discharge cycle but permit passage of current carrying ions, thus enabling the cell to function. In general for the best operation of secondary electrolytic cells it is advisable to retain the soluble ionic species in the vicinity of the appropriate electrode since metal deposits elsewhere may lead to inefficient operation of the cell, for example, loss of capacity, or even in extreme cases electrical shorting of the cell leading to failure.

In accordance with the present invention a process for the production of an electrode for an electrolytic cell includes the step of totally encapsulating the electrode material in a base polymer, immersing the encapsulated electrode material in an ethylenically unsaturated carboxylic acid monomer either in solution or in bulk and causing the monomer to copolymerise with the base polymer substrate. The copolymerisation of the ethylenically unsaturated carboxylic acid monomer with the base polymer may be brought about by any of the graft copolymerisation techniques known to the art. Hydrophylic homopolymer which may be formed concurrently with the copolymer is subsequently removed. By this means electrodes are produced which, when included in an electrolytic cell, are substantially separated from the rest of the cell save for transport of electrolyte through the encapsulating semi-permeable separator.

In one aspect of the present invention the initial encapsulation of the electrode material in the base polymer may be carried out by enclosing the electrode in a fold of the said base polymer and heat sealing the open edges to enclose the electrode totally. It may be advantageous in certain instances to extend the encapsulation some way up the lead to the electrode to ensure complete enclosure of the electrode.

In another aspect of the process of the present invention the electrode may be encapsulated in the base polymer by the application of a paste of particles of the base polymer in a dispersant to the electrode material followed by the application of heat to remove the dispersant from the paste and coalesce the particles of base polymer into an encapsulating film.

In yet another aspect of the process of the present invention the electrode material may be heated to a predetermined temperature, generally in the region of at least 200°C, followed by immersion in a fluidised bed of fine particulate base polymer, the said temperature and time of immersion being selected so that on removal from the fluidised bed the electrode material is coated with base polymer.

The coating may have coalesced to an encapsulating film on removal from the fluidised bed or it may be necessary to subject the film to further heating either in an oven or in a press to produce an encapsulating film of base polymer. This process may equally be applicable to the previous aspect of the invention in which the base polymer is applied as a dispersion.

Suitable base polymers for the practice of the present invention include the hydrocarbon polyolefins, eg,- polyethylene, polypropylene and poly-4-methylpentene-1, the polyamides, eg, the nylons, and the fluorinated polyolefins, eg,polytetrafluoroethylene.

Suitable ethylenically unsaturated carboxylic acid monomers include acrylic acid and its lower alkyl substituted homologues such as methacrylic acid but the preferred monomer is acrylic acid. In the present specification lower alkyl means straight or branched chain alkyl groups having less than five carbon atoms.

The copolymerisation is advantageously initiated by ionising radiation and gamma-photons or fast electrons are preferred, a cobalt-60 source is a convenient source of gamma-photons.

Encapsulated electrodes and processes for their manufacture will now be described, by way of example only. The following examples are of electrodes suitable for use in alkaline secondary cells, particularly silver/zinc cells.

EXAMPLE 1

This example describes the encapsulation of electrode material in a film of base polymer, which may be biaxially oriented high density polyethylene (hereafter HDPE), thickness 1–2 mil, cast or oriented low density polyethylene (hereafter LDPE), thickness 1.5 mil, or cast or oriented polypropylene (hereafter PP) thickness 0.5–1 mil.

The electrodes, formed or unformed, negative or positive, for an alkaline silver/zinc cell may be encapsulated in the base polymer film by heat sealing with a soldering iron, waxed paper being interposed between the soldering iron and the base polymer to prevent sticking. Heat shrinkable LDPE, that is LDPE which has been pre-irradiated to 5–20 Mrads, may be shrunk on to the electrode after heat sealing by the application of a hot air blast. The electrode material encapsulated in the base polymer is then placed in a flat aluminum alloy container and the grafting solution added. The system is flushed with an inert gas, e.g. nitrogen, closed and then irradiated to the desired dose. The electrode is finally removed from the aluminium alloy cell and soaked in methanol or a 5 percent aqueous solution of potassium hydroxide to remove the acrylic acid homopolymer.

(i) A formed positive electrode for an alkaline silver/zinc cell encapsulated in cast LDPE was placed in a solution of 17.5 percent by volume of acrylic acid, 5 percent by volume of carbon tetrachloride, 77.5 percent by volume of benzene and graft copolymerised by exposure to a $^{60}Co$ source at a ate of 0.462 Mrads/hour to a total dose of 0.75 Mrads. On discharge against a zinc electrode at rates of 26 mA/cm$^2$ and 52 mA/cm$^2$ this encapsulated electrode gave voltages of 1.47 and 1.40 respectively.

(ii) A formed positive electrode for an alkaline silver/zinc cell encapsulated in oriented PP was placed in a solution of 30 percent by volume of acrylic acid, 5 percent by volume of carbon tetrachloride and 65 percent by volume of benzene and graft copolymerised by exposure to $^{60}$Co source at a rate of 0.141 Mrads/hour to a total of 0.5 Mrads and the plate showed good discharge characteristics at high current densities.

Electrodes encapsulated in heat shrunk oriented LDPE may be graft copolymerised by immersion in a solution of 25 percent by volume of acrylic acid, 5 percent by volume of carbon tetrachloride and 70 percent by volume of benzene and exposure to a $^{60}$Co source at a rate of 0.446 Mrads/hour to a total of 0.75 Mrads.

EXAMPLE 2

Electrodes, formed or unformed, negative or positive, may be dipped in an aqueous emulsion of fine particles of base polymer, removed, air dried and sintered at a temperature in the region of 150°C in a hydraulic press under minimal positive pressure, and the encapsulated electrode grafted broadly as described in Example 1.

In a particular example a formed positive plate for an alkaline silver/zinc cell was dipped in an emulsion of fine particle (diameter about 10 microns) LDPE (70 parts by weight LDPE/30 parts by weight of water), removed, air dried and sintered at 150°C in a hydraulic press under minimal positive pressure. The grafting solution was 25 percent by volume of acrylic acid, 5 percent by volume of carbon tetrachloride and 70 percent by volume of benzene and irradiation was with a $^{60}$Co source at a rate of 0.479 Mrads/hour to a total of 0.75 Mrads. This grafted encapsulated plate when discharged against a zinc electrode at rates of 26 mA/cm$^2$ and 52 mA/cm$^2$ gave voltages of 1.40 and 1.25 respectively.

EXAMPLE 3

Electrodes, formed or unformed, negative or positive, may be encapsulated in LDPE as base polymer by heating in a hot air oven at a temperature in the region of 200°C for a time sufficient only for the electrode to attain that temperature, removing them from the oven and immediately dipping them in a fluidised bed of fine particulate (particle size about 100 microns) base polymer so that base polymer adheres to the electrode which is returned to the oven for a period of time of the order of 2 minutes to fuse the adhering base polymer. The encapsulated electrode is finally sintered at 140°C for 15 seconds between the plates of a hydraulic press at minimal positive pressure. The base polymer may then be graft copolymerised broadly as described in Example 2.

It will be realised that the conditions disclosed for encapsulating by hot dipping in a fluidised bed can be modified by those skilled in the art and in particular can be extended to other base polymers e.g. HDPE, PP, nylons or polytetrafluoroethylene.

In a particular example an electrode encapsulated in LDPE as disclosed above was placed in a solution of 25 percent by volume of acrylic acid, 5 percent by volume of carbon tetrachloride and 70 percent by volume of benzene and graft copolymerised by exposure to a $^{60}$Co source at a rate of 0.446 Mrads/hour to a total 0.75 Mrads.

The processes of totally encapsulating electrodes may be extended to other cells, for example silver primary cells, rechargeable silver/cadmium cells, or nickel/zinc cells, metal/air cells of both primary and replateable types and fuel cells.

We claim:
1. A process for the production of an electrode encapsulated in a selectively semi-permeable membrane for an electrolytic cell comprising the steps of
   a. totally encapsulating the electrolytic cell electrode in a base polymer,
   b. immersing the encapsulated electrode of step (a) in an ethylenically unsaturated carboxylic acid monomer selected from the group consisting of acrylic acid and its lower alkyl homologues, and
   c. causing the monomer of step (b) to copolymerize with the base polymer of step (a) while the base polymer and the monomere encapsulate the electrolytic cell electrode,
   whereby an electrode for an electrolytic cell totally enclosed in a encapsulating selectively semi-permeable membrane is produced.

2. A process as claimed in claim 1 including the additional step of removing any unsaturated carboxylic acid homopolymer formed in copolymerization step (c).

3. A process as claimed in claim 1 wherein the encapsulation of the electrode material in the base polymer is carried out by enclosing the electrode material in a fold of a film of the said base polymer material and heat sealing the edges of the film of base polymer so as to totally encapsulate the electrode material.

4. A process as claimed in claim 1 wherein the copolymerisation is initiated by ionising radiation.

5. A process as claimed in claim 1 wherein the step of encapsulating the electrode material in the base polymer is carried out by coating the electrode material with a paste of particulate base polymer in a dispersant followed by the application of heat to remove the dispersant and coalesce the particles of base polymer into an encapsulating film.

6. A process as claimed in claim 5 wherein the step of coalescing the particles of base polymer is carried out by heating, optionally in a heated press under minimal positive pressure.

7. A process as claimed in claim 1 wherein the edncapsulation of the electrode material in the base polymer is carried out by heating the electrode material to a pre-determined temperature followed immediately by immersion in a fluidised bed of particulate base polymer and removal therefrom; the said temperature and time of immersion being selected so that on removal from the fluidised bed the electrode material is coated with base polymer.

8. A process as claimed in claim 7 wherein the coating of base polymer is coalesced to a film by further heating.

9. A process as claimed in claim 8 wherein the coating of base polymer is coalesced to a film by heating in a heated press at minimal positive pressure.

10. A process as claimed in claim 1 wherein the base polymer is selected from the group consisting of hydrocarbon polyolefins, polyamides and fluorinated polyolefins.

11. A process as claimed in claim 10 wherein the base polymer is selected from the group consisting of polyethylene, polypropylene, and poly-4-methylpentene-1.

12. A process as claimed in claim 10 wherein the base polymer is selected from the group consisting of nylons and polytetrafluoroethylene.

13. A process for the production of an electrode encapsulated in a selectively semi-permeable membrane for an electrolytic cell comprising the steps of
  a. totally encapsulating the electrolytic cell electrode in a base polymer selected from the group consisting of hydrocarbon polyolefins, polyamides and fluorinated polyolefins by heating the electrode material to a pre-determined temperature followed immediately by immersion in a fluidized bed of particulate base polymer and removal therefrom; the said temperature and time of immersion being selected so that on removal from the fluidized bed the electrode material is coated with base polymer;
  b. immersing the encapsulated electrode of step (a) in an ethylenically unsaturated carboxylic acid monomer selected from the group consisting of acrylic acid and its lower alkyl homologues and
  c. causing the said monomer to copolymerize with the base polymer by means of ionizing radiation; whereby an electrode for an electrolytic cell totally enclosed in an encapsulating selectively semipermeable membrane is produced.

14. A process as claimed in claim 13 wherein the base polymer is selected from the group consisting of polyethylene, polypropylene, poly-4-methylpentene-1.

15. A process as claimed in claim 13 wherein the base polymer is selected from the group consisting of nylons and polytetrafluoroehtylene.

16. A process as claimed in claim 13 wherein the copolymerization is initiated by ionizing radiation.

17. A process as claimed in claim 13 including the additional step of removing any unsaturated carboxylic acid homopolymer formed in copolymerization step (c).

18. A process as claimed in claim 13 wherein the coating of base polymer is coalesced to a film by further heating.

19. A process as claimed in claim 18 wherein the coating of base polymer is coalesced to a film by heating in a heated press at minimal positive pressure.

20. A process for the production of an electrode encapsulated in a selectively semi-permeable membrane for an electrolytic cell comprising the steps of (a) totally encapsulating the electrolyte cell electrode in a base polymer selected from the group consisting of hydrocarbon polyolefins, polyamides and fluorinated polyolefins by enclosing the electrode material in a fold of a film of the said base polymer material and heat sealing the edges of the film of base polymer so as to totally encapsulate the electrode material; (b) immersing the encapsulated electrode of step (a) in an ethylenically unsaturated carboxylic acid monomer selected from the group consisting of acrylic acid and its lower alkyl homologues and (c); causing the said monomer to copolymerise with the base polymer by means of ionising radiation whereby an electrode totally enclosed in an encapsulating selectively semipermeable membrane is obtained.

21. A process for the production of an electrode encapsulated in a selectively semi-permeable membrane for an electrolytic cell comprising the steps of (a) totally encapsulating the electrolytic cell electrode in a base polymer selected from the group consisting of hydrocarbon polyolefins, polyamides and fluorinated polyolefins by coating the electrode with a paste of particulate base polymer in a dispersant followed by the application of heat to remove the dispersant and coalesce the particles of base polymer into an encapsulating film; (b) immersing the encapsuulated electrode of step (a) in an ethylenically unsaturated carboxylic acid monomer selected from the group consisting of acrylic acid and its lower alkyl homologues (c) causing the said monomer to copolymerise with the base polymer by means of ionising radiation whereby an electrode totally enclosed in an encapsulating selectively semipermeable membrane is obtained.

22. A process as claimed in claim 21 wherein the step of coalescing the particles of base polymer is carried out by heating.

* * * * *